US011000734B2

(12) United States Patent
Broadie et al.

(10) Patent No.: US 11,000,734 B2
(45) Date of Patent: May 11, 2021

(54) SYSTEMS AND METHODS FOR COMPUTING A STROKES GAINED PERFORMANCE METRIC FROM BALL FLIGHT DATA THAT CONSIDERS PREDETERMINED OFFLINE INFORMATION

(71) Applicant: KARSTEN MANUFACTURING CORPORATION, Phoenix, AZ (US)

(72) Inventors: Christopher M. Broadie, Phoenix, AZ (US); Martin R. Jertson, Phoenix, AZ (US); Erik M. Henrikson, Phoenix, AZ (US); Paul D. Wood, Phoenix, AZ (US)

(73) Assignee: Karsten Manufacturing Corporation, Phoenix, AZ (US)

(*) Notice: Subject to any disclaimer, the term of this patent is extended or adjusted under 35 U.S.C. 154(b) by 0 days.

(21) Appl. No.: 16/721,520

(22) Filed: Dec. 19, 2019

(65) Prior Publication Data

US 2020/0197747 A1 Jun. 25, 2020

Related U.S. Application Data

(60) Provisional application No. 62/940,534, filed on Nov. 26, 2019, provisional application No. 62/782,247, filed on Dec. 19, 2018.

(51) Int. Cl.
*A63B 69/36* (2006.01)
*A63B 24/00* (2006.01)
*A63B 71/06* (2006.01)
*A63B 102/32* (2015.01)

(52) U.S. Cl.
CPC ...... *A63B 24/0062* (2013.01); *A63B 71/0622* (2013.01); *A63B 69/3605* (2020.08); *A63B 2024/0034* (2013.01); *A63B 2024/0068* (2013.01); *A63B 2071/0691* (2013.01); *A63B 2071/0694* (2013.01); *A63B 2102/32* (2015.10);
(Continued)

(58) Field of Classification Search
CPC ........ A63B 69/3605; A63B 2024/0034; A63B 2024/0068; A63B 2102/32
See application file for complete search history.

(56) References Cited

U.S. PATENT DOCUMENTS

| 6,966,843 B2 | 11/2005 | Rankin et al. |
| 8,113,967 B1 | 2/2012 | Seluga et al. |
| 8,435,140 B1 | 5/2013 | Seluga et al. |

(Continued)

FOREIGN PATENT DOCUMENTS

| WO | 1994004982 | 3/1994 |
| WO | 2005118082 | 12/2005 |

OTHER PUBLICATIONS

International Search Report and Written Opinion for PCT/US2019/067615, dated Feb. 26, 2020.

(Continued)

*Primary Examiner* — James S. McClellan

(57) ABSTRACT

A system for computer-implemented golf shot analysis includes a tracking device and a computing device. The computing device accesses ball flight data generated by the tracking device in view of a predetermined gradient map and associated functionality to derive a performance metric that penalizes shots deemed to be offline.

10 Claims, 14 Drawing Sheets
(3 of 14 Drawing Sheet(s) Filed in Color)

(52) U.S. Cl.
CPC ....... *A63B 2220/12* (2013.01); *A63B 2225/50* (2013.01)

(56) References Cited

U.S. PATENT DOCUMENTS

| | | |
|---|---|---|
| 8,655,462 B2 | 2/2014 | Sanders |
| 8,747,257 B2 | 6/2014 | Hasegawa et al. |
| 8,758,171 B2 | 6/2014 | Hasegawa et al. |
| 9,542,596 B2 | 1/2017 | Freeman et al. |
| 10,207,170 B2 | 2/2019 | Penn et al. |
| 2003/0008731 A1 | 1/2003 | Anderson et al. |
| 2003/0149496 A1 | 8/2003 | Johnson |
| 2010/0087936 A1 | 4/2010 | Roullier |
| 2018/0200605 A1* | 7/2018 | Syed .................. A63B 24/0003 |

OTHER PUBLICATIONS

Broadie, "Assessing Golfer Performance on the PGA Tour" Apr. 8, 2011, Retrieved on Dec. 2, 2020, <https://pdfs.semanticscholar.org/cde9/63982ed3d944591dd9d8ff1610e1a4f103d.pdf.> p. 1-31.

pgatour.com, "Strokes gained: How it works." May 30, 2016, Retrieved on Dec. 2, 2020, <https://www.pgatour.com/news/2016/05/31/strokes-gained-defined.html>, entire document.

* cited by examiner

SYSTEMS AND METHODS FOR COMPUTING A STROKES GAINED PERFORMANCE METRIC FROM BALL FLIGHT DATA THAT CONSIDERS PREDETERMINED OFFLINE INFORMATION

CROSS-REFERENCE TO RELATED APPLICATIONS

This application claims the benefit of U.S. Provisional Patent Application No. 62/940,534, filed on Nov. 26, 2019 in its entirety; and further claims the benefit of U.S. Provisional Patent Application No. 62/782,247, filed on Dec. 19, 2018 in its entirety. The content of all disclosures above are incorporated fully herein by reference.

TECHNICAL FIELD

The present disclosure relates to computing and tracking technologies for computer-implemented golf shot analysis and optimal club selection; and more particularly, to a computing and tracking system that utilizes ball flight data captured from a tracking device to derive a strokes gained performance metric that considers carry information and predefined offline information corresponding to a variable penalty parameter corresponding to a predefined gradient map.

BACKGROUND

The current strokes gained statistic and associated method, derived by Mark Broadie, evaluates a golfer's overall performance after a round of golf, or a golf hole. The strokes gained metric relates to a method that considers compiled professional and amateur data to calculate an expected strokes value to "hole out" from varying starting locations and corresponding distances from a golf hole, and conditions (tee, fairway, rough, sand, green, recovery, water, etc.). For example, for a drive on a golf course, the ball will travel from one condition (the tee) to another condition (fairway, rough etc.). The strokes gained by that shot can be calculated as the expected strokes to hole out from the starting location, minus the expected strokes to hole out from the ending location, minus the one stroke taken. The current strokes gained method allows for a golfer to evaluate his or her performance, following a round, and determine where shots were lost (i.e. hitting a ball into the water), and where strokes can be saved, by improving different aspects of one's game. The strokes gained method can be implemented by a computing device configured to execute the foregoing functionality.

However, the strokes gained performance metric does not account for the severity of a mishit (missed shot); merely, all shots that miss the targeted area are equally penalized during the statistical analysis (i.e., a shot that is 1 yard off the fairway, is considered equally as negative as a shot that is 30 yards off the fairway). Additionally, the strokes gained metric cannot be applied to all terrains (e.g., a driving range or digital golf simulator), except a golf course. Therefore, the current strokes gained statistic can only be utilized when playing a round of golf; such that it is technically lacking with respect to analysis required during practice or fitting sessions.

There is a technical need in the art for technology operable to analyze golf shots along any terrain (not limited to a golf course), and operable to implement functionality for recommending a selection of a club based on how a golfer consistently strikes a particular golf club; relative to a target hole and target distance along the terrain. It is with these observations in mind, among others, that various aspects of the present disclosure were conceived and developed.

BRIEF DESCRIPTION OF THE DRAWINGS

The application file contains at least one photograph executed in color. Copies of this patent application publication with color photographs will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
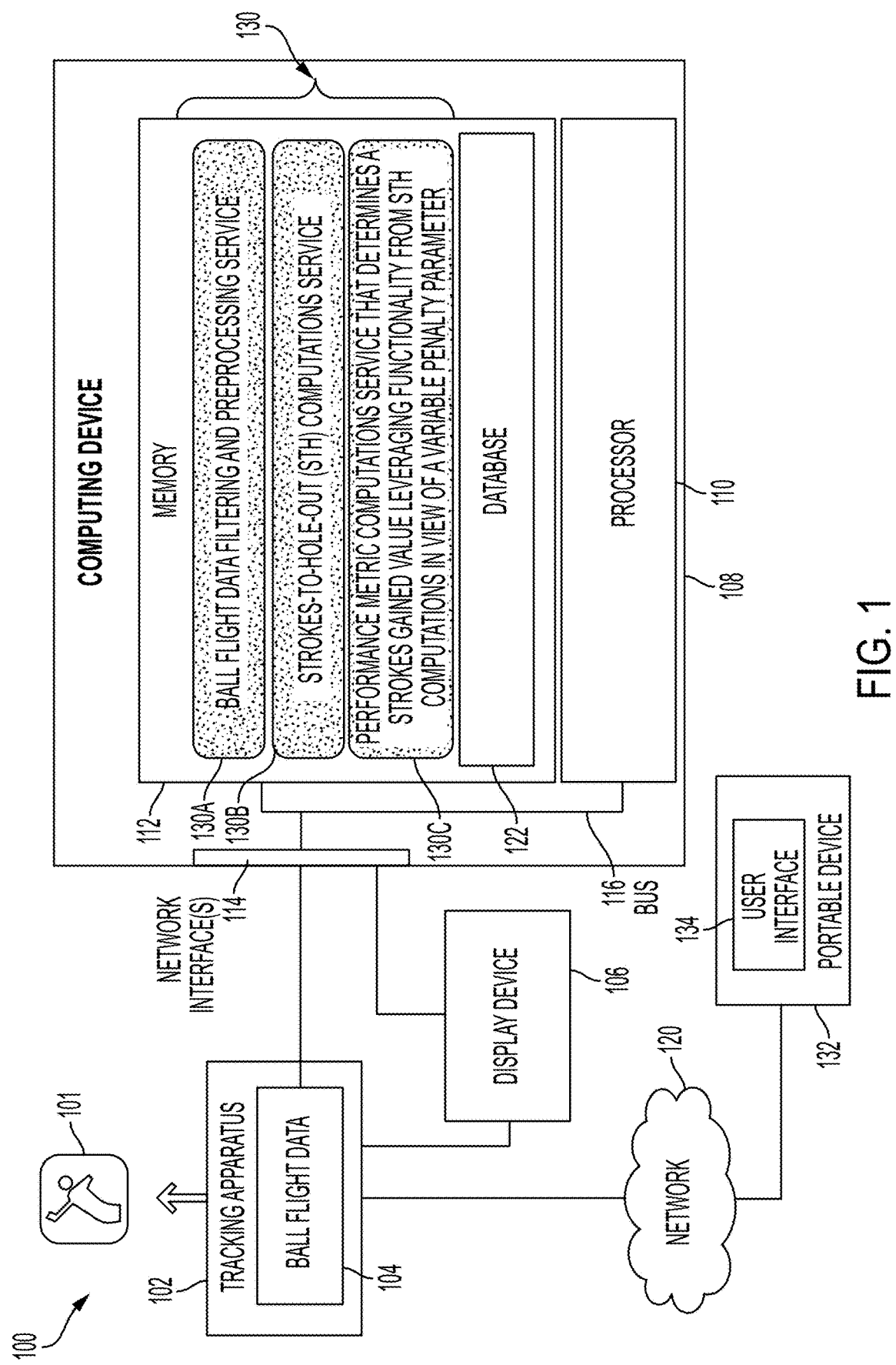
FIG. 1 is a diagram of a system for generating ball flight data from a plurality of golf shots struck by a golfer and computing one or more performance metrics from the ball flight data to evaluate a performance of a golfer.

Aspects of the present disclosure relate to a computer-implemented system and associated methods for computing a performance metric associated with a strokes gained value for golf shots that considers predefined offline information. Computation of the strokes gained value may be employed for many useful applications including generating computer-implemented recommendations for one golf club versus another. In some embodiments, the performance metric relates in part to a predefined penalty function defining a gradient map that is applied to flight data generated from a plurality of golf shots monitored with one or more of a tracking device of a tracking apparatus. The variable penalty parameter effectively penalizes golf shots considered to be undesirable for whatever reason. More specifically, for example, golf shots determined to be 10 yards offline relative to a longitudinal axis between a starting position and a target position (e.g., golf hole) may define a penalty parameter value of 0.2, whereas golf shots determined to be 20 yards offline relative to the longitudinal axis between the starting position and the target position may define a penalty parameter value of 0.50; such that the variable penalty parameter penalizes golf shots that are offline for whatever reason, and impacts an overall strokes gained value for that shot. In some embodiments, the gradient map and associated penalty parameter may be custom-tailored or modified to accommodate any number of different applications, such that the performance metric may consider the unique characteristics of a particular terrain or specific course, or any number of desired conditions. In this manner, the computer-implemented system is a technical improvement over conventional club selection/shot analysis systems that fail to penalize offline shots or consider unique course characteristics.

In other words, the performance metric assigns a numerical strokes gained value to each of a series of golf shots; wherein a larger strokes gained value generally corresponds with a greater potential for success for the golfer. When executed, the performance metric provides data points to assist golfers with evaluating potential success with a certain golf club, e.g., in a practice setting, prior to playing golf. The performance metric can be used on any terrain (i.e., driving range, golf simulator, golf course) where the shot distance and a distance offline, as defined by the gradient mapping, can be tracked. Further, the gained performance metric can assist with optimal club selection/recommendation by a computing device, because the performance metric can inherently evaluate potential for success with a certain golf club. Furthermore, the gained performance metric can improve a golfer's decision making, when deciding what club to hit off a tee box (e.g., a greater strokes gained value corresponding to a fairway wood than with a driver may be used to suggest that the golfer select the fairway wood over the driver).

Referring to FIG. 1, a computer-implemented system (hereinafter "system") 100, is shown which may be implemented to generate flight data from a plurality of golf shots associated with a golfer 101, and execute a performance metric that may be used to further generate a recommendation between one golf club and another. In general, the system 100 includes a tracking apparatus 102 that generates ball flight data 104 from a plurality of golf shots struck by the golfer 101, a display device 106 that display the ball flight data 104, and other aspects described herein, and a computing device 108 in operable communication with the display device 106 that accesses the ball flight data. The computing device 108 inputs the ball flight data 104 and executes functionality or is otherwise configured for generating a strokes gained performance metric (e.g., 607 in FIG. 6A) that may be used to improve recommendations between golf clubs. The performance metric is derived from an improvement to the strokes gained statistic, and utilizes a variable penalty parameter defining a gradient map, as further described herein.

In some embodiments, the computing device 108 includes a processor 110, a memory 112 of the computing device 108 (or separately implemented), a network interface (or multiple network interfaces) 114, and a bus 116 (or wireless medium) for interconnecting the aforementioned components. The network interface 114 includes the mechanical, electrical, and signaling circuitry for communicating data over links (e.g., wired or wireless links) associated with a network 120 (e.g., the Internet, a Bluetooth connection, a local area network (LAN), and the like). The network interface 114 may be configured to transmit and/or receive data using a variety of different communication protocols, as will be understood by those skilled in the art.

As indicated, via the network interface 114 or otherwise, the computing device 108 accesses the ball flight data 104 from the tracking apparatus 102. In general, once accessed and/or stored within a database 122, the processor 110 executes a plurality of services 130 to compute various data points useful for evaluating an individual golfer's performance based on any number of predefined conditions (e.g., evaluating the golfer's performance for a specific club, and/or evaluating a golfer's performance for a particular terrain). For example, the strokes gained value computations service 130B may be executed to identify an initial strokes gained value from one or more golf ball shots, and the performance metric computations service 130C may further be executed to identify a performance metric by modifying and/or transforming the strokes gained value based on a variable penalty parameter, as further described herein. The plurality of services 130 may include any number of components or modules executed by the processor 110 or otherwise implemented. Accordingly, in some embodiments, one or more of the plurality of services 130 may be implemented as code and/or machine-executable instructions executable by the processor 110 that may represent one or more of a procedure, a function, a subprogram, a program, a routine, a subroutine, a module, an object, a software package, a class, or any combination of instructions, data structures, or program statements, and the like. In other words, one or more of the plurality of services 130 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory 112), and the processor 110 performs the tasks defined by the code.

The system 100 is non-limiting and additional components would be appreciated by those of ordinary skill in the art. In some embodiments, for example, the computing device 108 is in operable communication with a portable device 132, which may correspond to an individual golfer or fitter. The portable device 132 may include a smartphone, laptop, tablet, or other portable device that may be used to execute a user interface 134 and to access data associated with the performance metric described herein, receive a club recommendation, and other feedback information after a golfer is evaluated with the system 100. In addition, although not depicted, the system 100 may leverage data from external devices, such as professional golfer shot information, course information, club information, and other forms of information which may be used to tailor the variable penalty parameter and the gradient map, or modify functionality described herein.

Referring now to a process flow diagram 200 of FIG. 2, one method of implementing the system 100 shall now be described. Referring to block 202, a gradient map, such as gradient map 300 of FIG. 3, may be defined, generated, or accessed based on a variable penalty parameter. In general, the gradient map 300 is a visual representation that may be used to evaluate golf shots along a terrain 302. The gradient map 300, defined by a variable penalty parameter function (described in FIG. 6A) designates a particular value for a variable penalty parameter 304 based on where golf shots land along the gradient map 300. In general, the gradient map 300 is configured to account for the severity of a miss, thus providing a more accurate indication of potential for success to achieving longer and/or accurate golf shots, following certain tee shots along the terrain 302.

Figure 3:
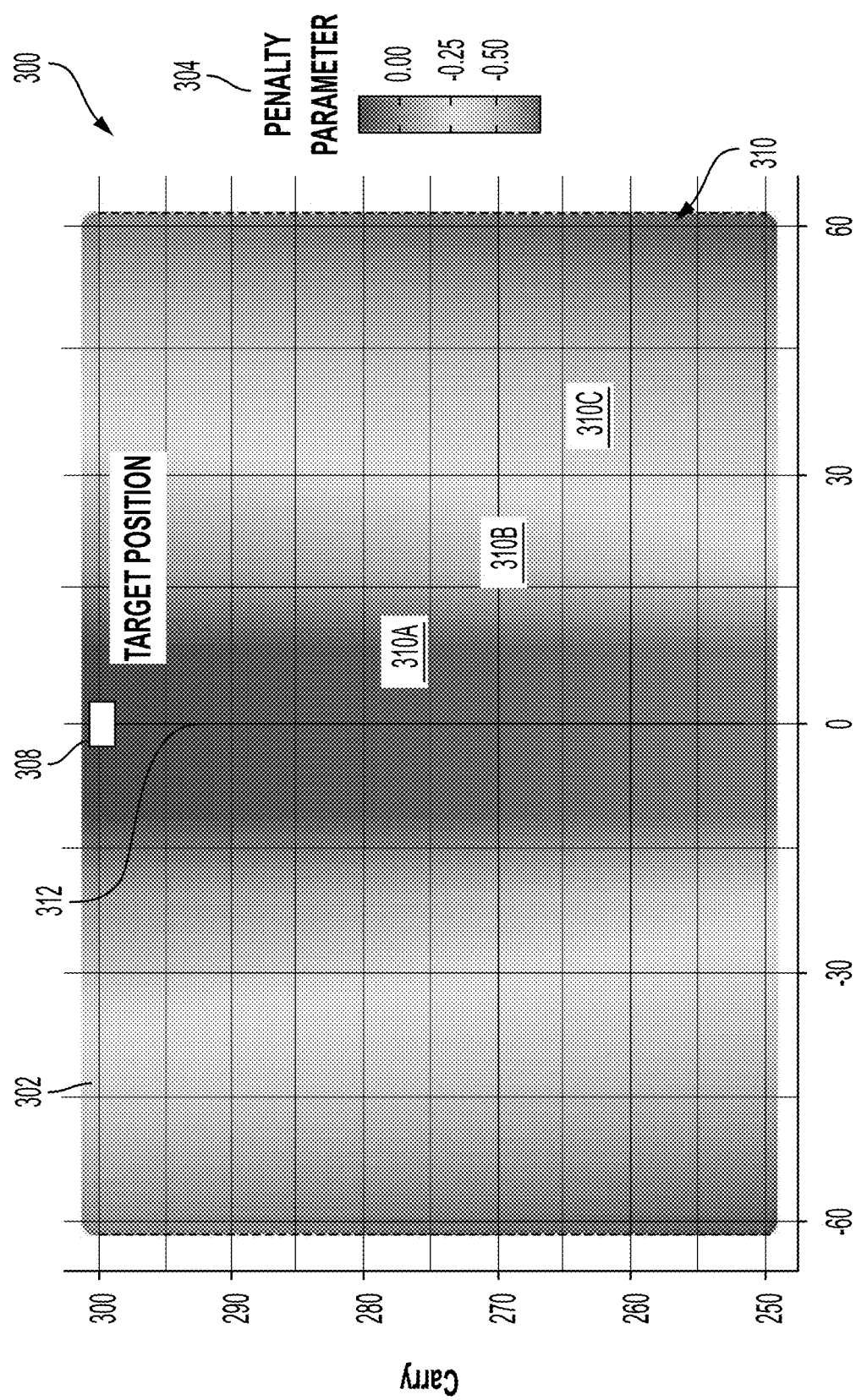
FIG. 3 is a graphical image of a predefined gradient map or mapping that may be applied to golf ball flight data associated with one or more golf clubs to derive a performance metric that considers a variable penalty parameter between the starting position and a target position.

In FIG. 3, the gradient map 300 is illustrated using an X-Y graph with the y-axis corresponding to a carry distance along the terrain 302, and the X-axis corresponding to an offline distance. In some embodiments, as indicated, the gradient map 300 includes or considers a starting position 306 such as a tee position, and a target position 308, such as a golf hole. In the configuration of the gradient map 300 shown, a golf shot that carries more distance (lands closer to the target position 308) and is straighter (e.g., lands in a position along the terrain 302 that is more linearly aligned with the target position 308) is penalized less, or not at all, such that the variable penalty parameter 304 defined by the gradient map 300 is reduced for shots that are not considered to be offline between the starting position 306 and the target position 308.

In some embodiments, the gradient map 300 defines geometric regions 310 relative to a longitudinal axis 312 between the starting position 306 and the target position 308 that indicate whether a golf shot is "offline" or not, and to what degree. For example, with the gradient map 300, the geometric region 310A extending along the longitudinal axis 312, provides a null value for the variable penalty parameter 304 for a golf shot landing within the area defined, the geometric region 310B provides a penalty parameter value of 0.25 for a golf shot landing within the area defined, and the geometric region 310C provides a penalty parameter value of 0.50 for a golf shot landing within the area defined. As indicated, the geometric region 310A is generally linear in shape, and the geometric region 310B extends around the geometric region 310B and flares out or increases in width proximate to the target position 308. In this manner, shots that are struck with greater distances are penalized less, even if they are considered to be somewhat offline, i.e., not landing within the geometric region 310A which is deemed in gradient map 300 to be an ideal landing position for a golf shot.

In the example of gradient map 300, shots hit within the geometric region 310A, or less than ten yards offline (less than ten yards from the longitudinal axis 312B), may be considered to hit a fairway portion of the terrain 302, or otherwise be deemed "online" considering the location of the starting position 306 and the target position 308. However, shots falling along the geometric regions 310 further away from the longitudinal axis 312B, especially closer to the starting position 306, would be considered to within a rough portion of the terrain 302 or otherwise require recovery (e.g., dropping in play for a penalty, playing backwards or sideways to a more forgiving terrain). One goal of the gradient map 300 is to reflect that a shot that is 50 yards offline is worse than a shot that is 30 yards offline because it will generally have a greater chance of falling within a water hazard, desert, out of bounds, tall grass (heavy rough), a wooded area, or a recovery position on the course. From FIG. 3, one can determine that a 300 yard carry that is 37 yards offline is roughly equivalent to a 250 yard carry that is 25 yards offline. Further, one can determine that a 290 carry that is 15 yards offline is roughly equivalent to a 260 yard carry that is 0 yards offline.

Figure 4A:
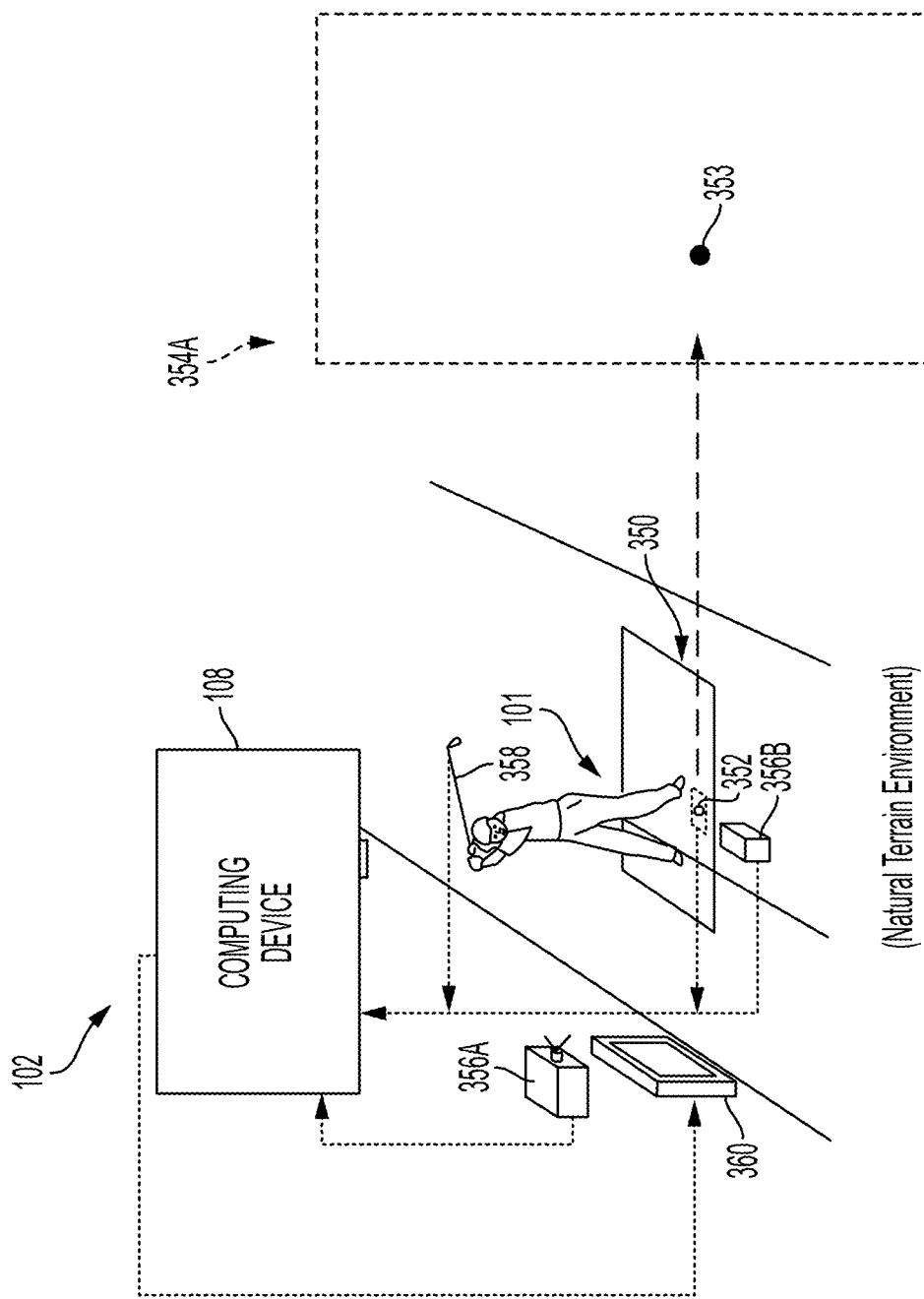
FIG. 4A is an illustration depicting a perspective view of a golfer making a plurality of golf shots against a natural terrain using one or more golf clubs while being monitored by a tracking device that generates golf ball flight data from the golf shots.
Figure 4B:
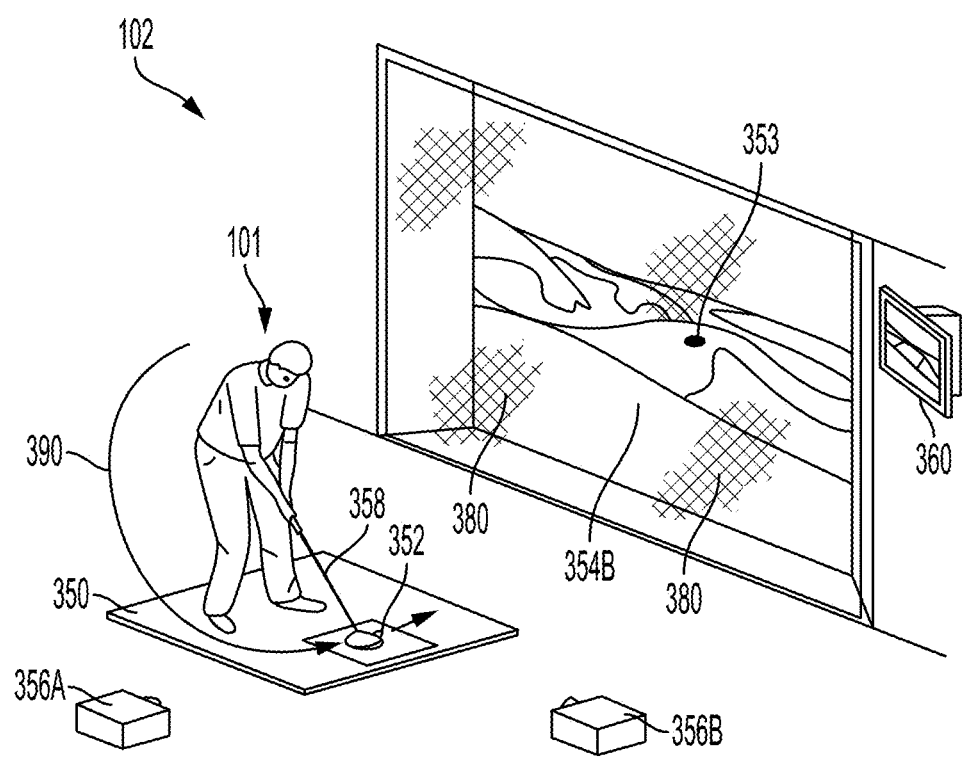
FIG. 4B is an illustration depicting a perspective view of a golfer making a plurality of golf shots against a virtual or manufactured terrain using one or more golf clubs while being monitored by a tracking device that generates golf ball flight data from the golf shots.

Referring to block 204, once the variable penalty parameter 304 and associated gradient map 300 are defined or configured as desired, ball flight data 104 from a plurality of golf shots from the golfer 101 may be generated by the tracking apparatus 102, and made accessible or transmitted to the computing device 108, so that the ball flight information 104 can be applied to the gradient map 300 to evaluate the golfer 101, as further described herein. FIGS. 4A-4B illustrate implementation of the tracking apparatus 102 to generate the ball flight data 104 in different environments/settings. For example, FIG. 4A illustrates the generation of ball flight data 104 when golf ball shots are struck over a natural or physical terrain (terrain 354A), and FIG. 4B illustrates the generation of ball flight data 104 when golf ball shots are struck against a virtual terrain (e.g., terrain 354B). In either case, the golfer 101 may perform any number of swings to generate the ball flight data 104.

As shown in FIGS. 4A-4B, the golfer 101 is positioned along a shot position 350 associated with the tracking apparatus 102 and is prepared to strike a golf ball 352 in the direction of a target position 353 positioned along a terrain 354. The shot position 350 may be a tee box, in the form of a mat (e.g. synthetic turf), or natural grass area of a driving range, but the present disclosure is not limited in this regard. In general, the tracking apparatus 102 generates the ball flight data 104 by capturing various features when the golfer 101 strikes the golf ball 352 towards the terrain 354. More specifically, the tracking apparatus 102 includes a plurality of tracking devices 356 or ball monitoring equipment, designated tracking device 352A and the tracking device 352B, that may record various features of the golfer's swing (390 in FIG. 4B), such as a swing path, the club orientation, and/or the ball's flight, and may track or predict the flight of a golf ball from the shot position 350 to a landing position (not shown) along the terrain 354. In addition, ball flight data 104 generated by the tracking devices 356 may identify or predict a landing position, the total distance traveled by the golf ball 352 from the shot position 350 to the landing position, and the remaining distance to a target position, such as target position 308. The tracking devices 356 may include one, or any number of cameras, sensors, videographic devices and any other such devices that may be utilized to track the flight of the golf ball 352 along the terrain 354 and identify a final landing position, which may be in the form of physical coordinates in latitude and longitude along the terrain 354. In some embodiments, the tracking devices 356 may include a radar-based system, such as a TrackMan system or other such commercial system that measures a full trajectory of a golf shot, pinpointing the landing position to a predetermined accuracy value, and maps the shot's three-dimensional (3D) trajectory in real-time, together with impact and launch information. The tracking devices 356 may further include an optical system such as a GCQuad system or other such commercial system with a high speed quadrascopic camera that determines exact launch conditions of a shot of the golf ball 352 (such as ball speed, launch angle, and spin rate), which can be paired with a ball flight algorithm to determine or predict a final landing position of the shot of the golf ball 352. Additionally, sensors may be provided within the golf ball 352 or a club 358 used by the golfer 101 to assist with generation of the ball flight data 104.

As shown in FIG. 4A, information about the flight of the golf ball 352 is communicated to the computing device 108, which may optionally output aspects of the golf ball strikes to an output device 360, using a wired or wireless connection and any desired transmission protocol. In one specific example, the output device 360 may be a monitor and/or computer speaker in operative connection with the computing device 108, to provide an audio and/or digital display. The output device 360 may be located at or near the location of the starting position 350 as shown. Where desired, the output device 360 may display launch monitor data, a shot dispersion display, or other information regarding the individual swings and ball strikes of the golfer 101, as the ball flight data 104 is being collected for to derive a strokes gained performance metric, as further described herein. As another example, the output device 360 may be a smartphone or other portable electronic device (such as a golf GPS device) of the golfer 101 or a fitter, and the communication therewith may be wireless, optionally over a cellular telephone network, the Internet, or other communication network.

As shown, the tracking devices 356 may be positioned anywhere around the golfer 101 such that, e.g., the golfer is hitting at a tracking device 356 or such a device is positioned along the heel end side of the golfer 101 behind the golfer's back. Even further, additional tracking or measuring devices may be placed overhead or practically anywhere such that the devices can record data such as video images of the golfer's movements or track and record data or characteristics associated with the portions of the golf club or ball movement such as velocity, direction, orientation, and other characteristics.

The tracking apparatus 102 may include any of a number of ancillary arrangements and features. For example, as in FIG. 4B, the tracking apparatus 102 includes a net 380 that the golfer 101 may hit the ball into while performing his or her shots, practice swings, and/or swings to generate the ball flight data 104 by the tracking devices 356. The net 380 may permit tracking of the shots to be achieved in a more limited space such as the indoors, in a pro shop, or in a driving range with limited land available. While not specifically depicted, the virtual terrain 354B may house or protect, or otherwise include a further measuring device(s) including velocity or force sensors, videographic devices and other devices that may be utilized to track the flight of the ball from the shot position 350 to a virtual landing position (not shown).

Figure 2:
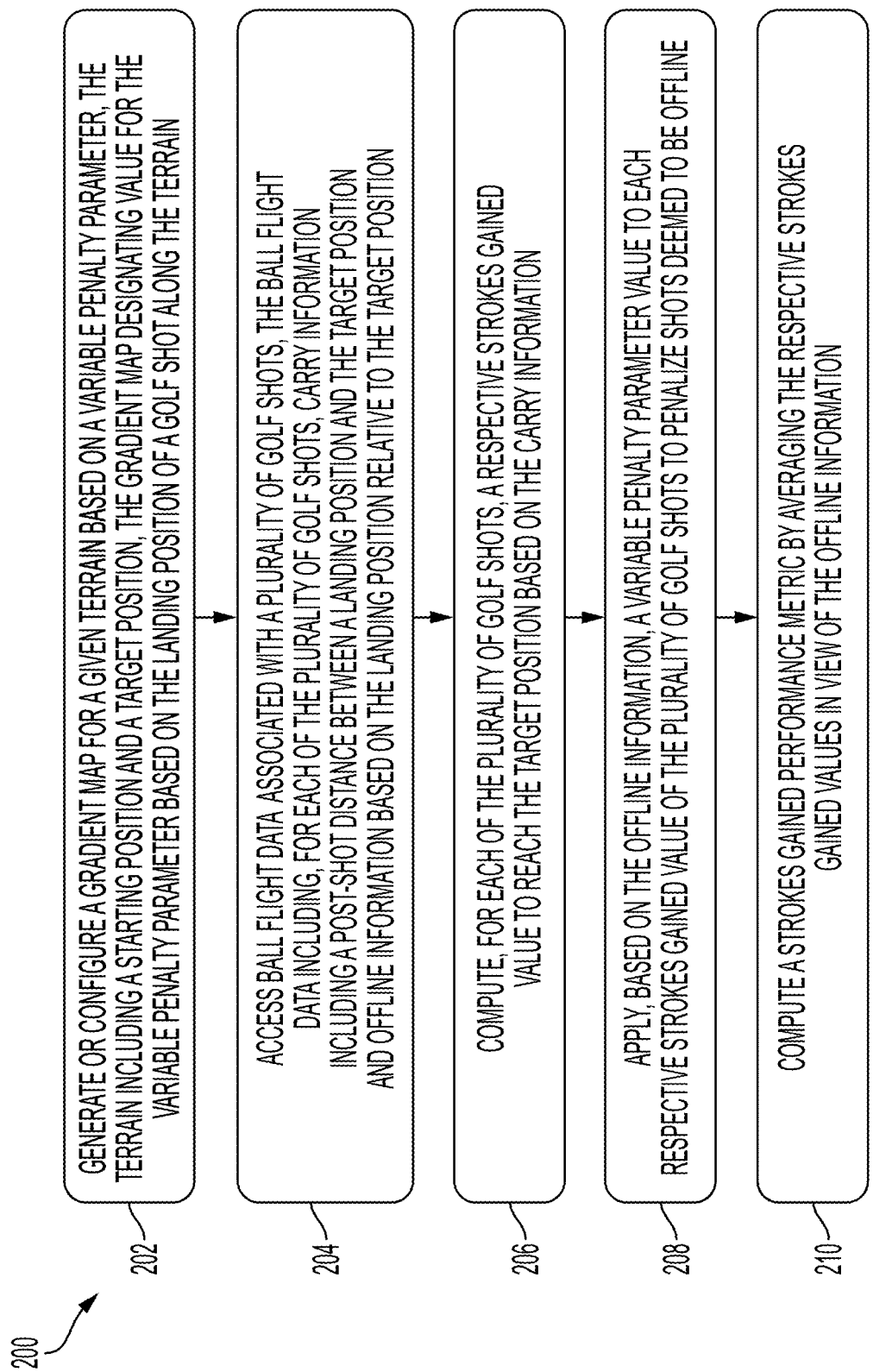
FIG. 2 is a process flow diagram representing one process for implementing the system of FIG. 1 to derive a performance metric for evaluating an individual golfer based on predetermined features of a penalty parameter function defining a gradient map that considers certain golf shots deemed to be offline in view of a target position and a starting position.
Figure 5:
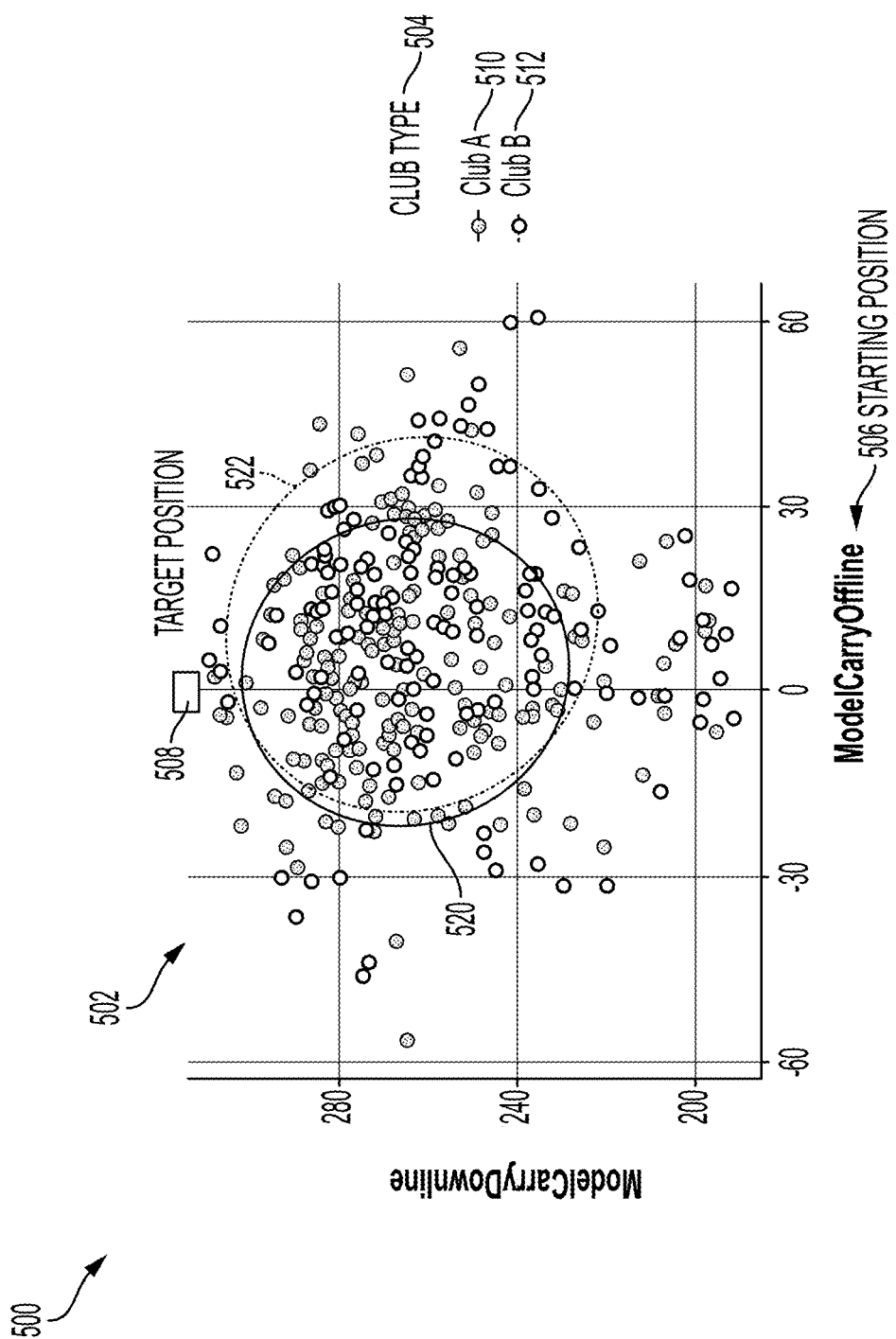
FIG. 5 is a graphical image depicting a basic shot dispersion display from ball flight data associated with a plurality of golf shots struck by two different golf clubs.

Referring back to block 204 of FIG. 2, the tracking apparatus 102 may generate the ball flight data 104 for any number of shots the golfer 101 strikes along a given terrain towards a target or target position. A basic representation of a shot dispersion display 500 for a plurality of golf shots is shown in FIG. 5 (which may be rendered along the display device 106 of FIG. 1). In the example shown, the shot dispersion display 500 plots a plurality of golf shots along a given terrain 502, the shots corresponding to a club type 504 relative to a starting position 506, and a target position 508. In the specific example shown, a plurality of shots 510 are plotted along the shot dispersion display 500 corresponding to a "Club A" type club, and a plurality of shots 512 are plotted along the shot dispersion display 500 corresponding to a "Club B" type club. In addition, as shown, the shot dispersion display 500 may include a perimeter 520 defining a first stat area associated with the plurality of shots 510; and a perimeter 522 defining a second stat area associated with the plurality of shots 512. Each of the perimeters 520 and 522 may be indicative of two or more shots taken with a corresponding golf dub (e.g., visual measures of dispersion). Further, each of the perimeters 520 and 522 may encompass a particular predefined percentage of shots within a predefined area (e.g., 90%) whereas a number of shots may fall outside of that particular perimeter (e.g., 10%). Although FIG. 5 shows the perimeters 520 and 522 having elliptical shapes, embodiments described herein may include perimeters with other suitable shapes (e.g., circular, rectangular, etc.), such that the present disclosure is not limited in this regard.

In the example of FIG. 5, the shot dispersion display 500 may be utilized to determine a basic strokes-to-hole-out value. However, each individual shot shown does not consider offline information. In particular, the shot dispersion display 500 does not penalize offline shots or distinguish shots from one another in a useful way. In other words, the shot dispersion display 500 and associated information is technically lacking.

Figure 6A:
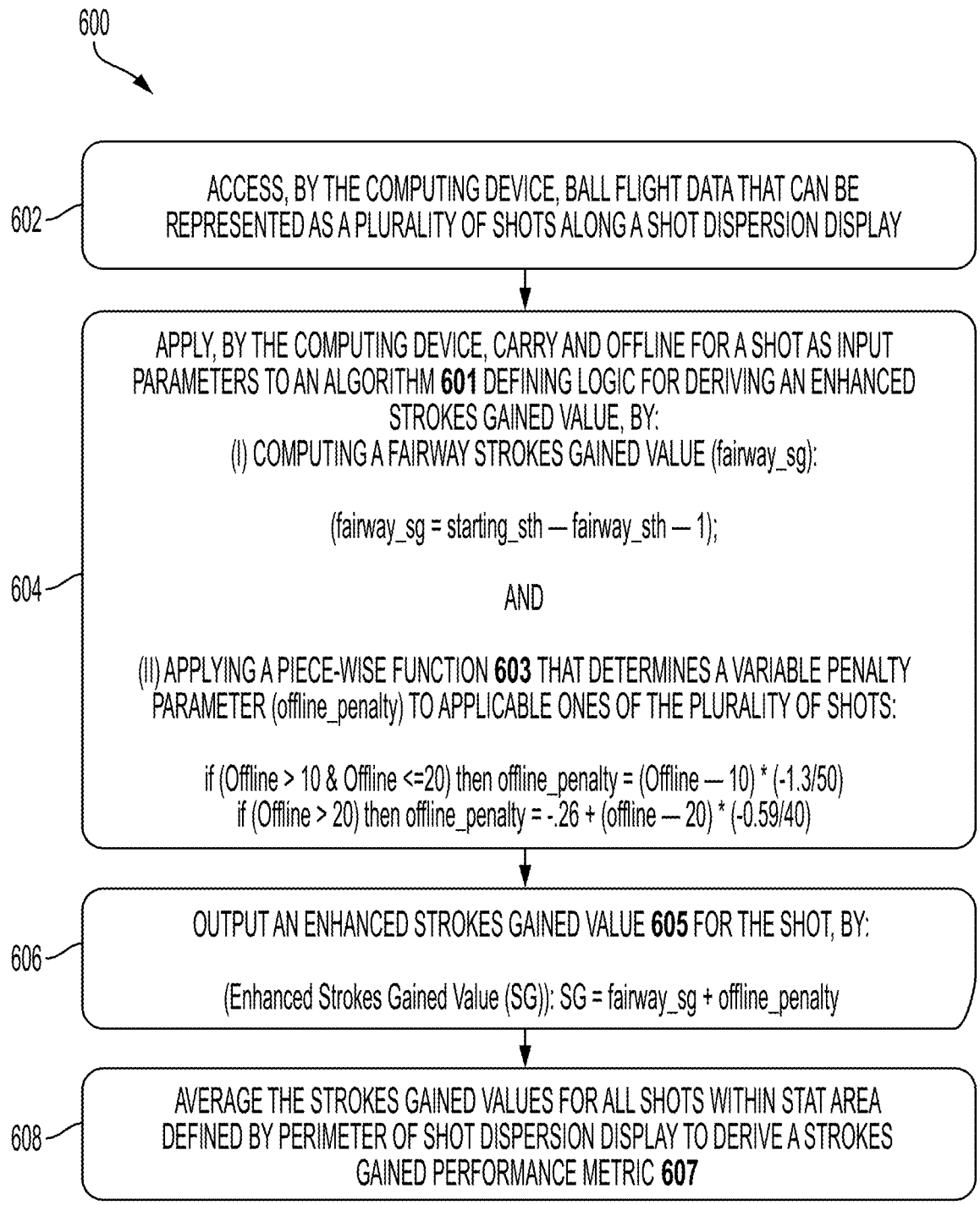
FIG. 6A is a simplified block diagram of a computer-implemented method including an algorithm for generating a strokes gained performance metric in view of ball flight data associated with a plurality of shots of a golf club.

Referring to block 206, block 208, and block 210 of FIG. 2, a strokes gained performance metric, in the form of a numerical value, can be computed for the plurality of shots 510 and/or the plurality of shots 512 according to the logic and functionality of FIG. 6A, executable by the computing device 108. As indicated, in block 602 and block 604 of FIG. 6A, the ball flight data 104 generated by the tracking apparatus 102 may be accessed by the computing device 108 as before.

Next, as indicated in block 604 and block 606, the computing device 108 applies carry and offline information for each shot to an algorithm 601 to compute an enhanced strokes gained value corresponding to each shot. In particular, as an initial step, the algorithm 601 processes the carry and offline information provided by the tracking apparatus 102 for each shot and converts this information into an initial strokes gained value, represented in FIG. 6A as a "distance performance parameter". For this initial computation, the algorithm 601 assumes a 425-yard length hole where almost all golfers would choose to hit a driver. Average strokes to hole-out for PGA Tour golfers from various distances and starting conditions (tee, fairway, rough, sand, green) is used as baseline information, and is specified in Table 1.

TABLE 1

Average number of shots to hole out from a distance.

| Distance (yds) | Tee | Fairway | Rough | Sand | Recovery |
|---|---|---|---|---|---|
| 20 | | 2.40 | 2.59 | 2.53 | |
| 40 | | 2.60 | 2.78 | 2.82 | |
| 60 | | 2.70 | 2.91 | 3.15 | |
| 80 | | 2.75 | 2.96 | 3.24 | |
| 100 | 2.92 | 2.80 | 3.02 | 3.23 | 3.80 |

TABLE 1-continued

Average number of shots to hole out from a distance.

| Distance (yds) | Tee | Fairway | Rough | Sand | Recovery |
|---|---|---|---|---|---|
| 120 | 2.99 | 2.85 | 3.08 | 3.21 | 3.78 |
| 140 | 2.97 | 2.91 | 3.15 | 3.22 | 3.80 |
| 160 | 2.99 | 2.98 | 3.23 | 3.28 | 3.81 |
| 180 | 3.05 | 3.08 | 3.31 | 3.40 | 3.82 |
| 200 | 3.12 | 3.19 | 3.42 | 3.55 | 3.87 |
| 220 | 3.17 | 3.32 | 3.53 | 3.70 | 3.92 |
| 240 | 3.25 | 3.45 | 3.64 | 3.84 | 3.97 |
| 260 | 3.45 | 3.58 | 3.74 | 3.93 | 4.03 |
| 280 | 3.65 | 3.69 | 3.83 | 4.00 | 4.10 |
| 300 | 3.71 | 3.78 | 3.90 | 4.04 | 4.20 |
| 320 | 3.79 | 3.84 | 3.95 | 4.12 | 4.31 |
| 340 | 3.86 | 3.88 | 4.02 | 4.26 | 4.44 |
| 360 | 3.92 | 3.95 | 4.11 | 4.41 | 4.56 |
| 380 | 3.96 | 4.03 | 4.21 | 4.55 | 4.66 |
| 400 | 3.99 | 4.11 | 4.30 | 4.69 | 4.75 |
| 420 | 4.02 | 4.15 | 4.34 | 4.73 | 4.79 |
| 440 | 4.08 | 4.20 | 4.39 | 4.78 | 4.84 |
| 460 | 4.17 | 4.29 | 4.48 | 4.87 | 4.93 |
| 480 | 4.28 | 4.40 | 4.59 | 4.98 | 5.04 |
| 500 | 4.41 | 4.53 | 4.72 | 5.11 | 5.27 |
| 520 | 4.54 | 4.66 | 4.85 | 5.24 | 5.30 |
| 540 | 4.65 | 4.78 | 4.97 | 5.36 | 5.42 |
| 560 | 4.74 | 4.86 | 5.05 | 5.44 | 5.50 |
| 580 | 4.79 | 4.91 | 5.10 | 5.49 | 5.55 |
| 600 | 4.82 | 4.94 | 5.13 | 5.52 | 5.58 |

The average strokes to hole out from 425 yards is 4.04. The fairway strokes to hole out baseline can then be used to assign a strokes gained value for a shot finding the fairway. For example, a shot that travels 305 yards to the fairway will have 120 yards remaining and an expected strokes to hole out of 2.85. An average shot should travel from 4.04 strokes to hole out to 3.04 strokes to hole out. This example drive was 0.19 strokes better than average because it now has 2.85 strokes to hole out rather than 3.04. The formal equation for the strokes gained of a single shot is:

Strokes Gained=Starting Strokes to Hole Out−Finishing Strokes to Hole Out−1

Specific functionality of the algorithm 601 for determining the distance performance parameter value (fairway_sg) may be defined as follows:
Inputs: Carry, Offline
Output: SG (Strokes Gained)
starting_sth=4.04;
end_dist=425−Carry;

fairway_sth=−3.36089$E$−15*end_dist$^6$+7.05134$E$−12*end_dist$^5$−5.30361$E$−09*end_dist$^4$+1.80822$E$−06*end_dist$^3$−2.83067$E$−04*end_dist$^2$+2.21293$E$−02*end_dist+2.05282$E$+00;

and fairway_sg=starting_sth−fairway_sth−1.     Equation 1

As further shown in FIG. 6A, the algorithm 601 is configured to penalize offline shots by applying an offline penalty piece-wise function 603 that ultimately assigns a variable penalty parameter value based on the offline information of the shot. In general, the offline penalty piece-wise function 603 defines the gradient map 300 illustrated in FIG. 3. In other words, the structure of the offline penalty piece-wise function 603 determines how the system 100 applies a variable penalty parameter represented by the gradient map 300. These gradient maps 300 change depending on the course played as each course is a unique footprint of fairway, penalty, and hole/green placement. As previously described, the gradient map 300 defined by the offline penalty piece-wise function 603 favors distance and shots proximate to the longitudinal axis 312 as demonstrated by the geometric regions 310 and their corresponding penalty parameter values. However, in other embodiments, the offline penalty piece-wise function 603 may be modified as desired to reconfigure the gradient map 300 to penalize a particular area along the terrain 302 as desired. In other words, the general gradient of the variable penalty parameter, and eventual strokes gained value, can be tailored for different embodiments by applying modifications to the offline penalty piece-wise function 603 as desired.

In some embodiments, the offline penalty piece-wise function 603 may be defined as:
For offline values less than 10 yards, offline penalty=0;

For offline values greater than 10 yards but less than 20 yards, offline penalty=(offline−10)*(−1.3/50); and For offline values greater than 20 yards, offline penalty=−0.26+(offline−20)*(−0.59/40).     Equation 2

Figure 6B:
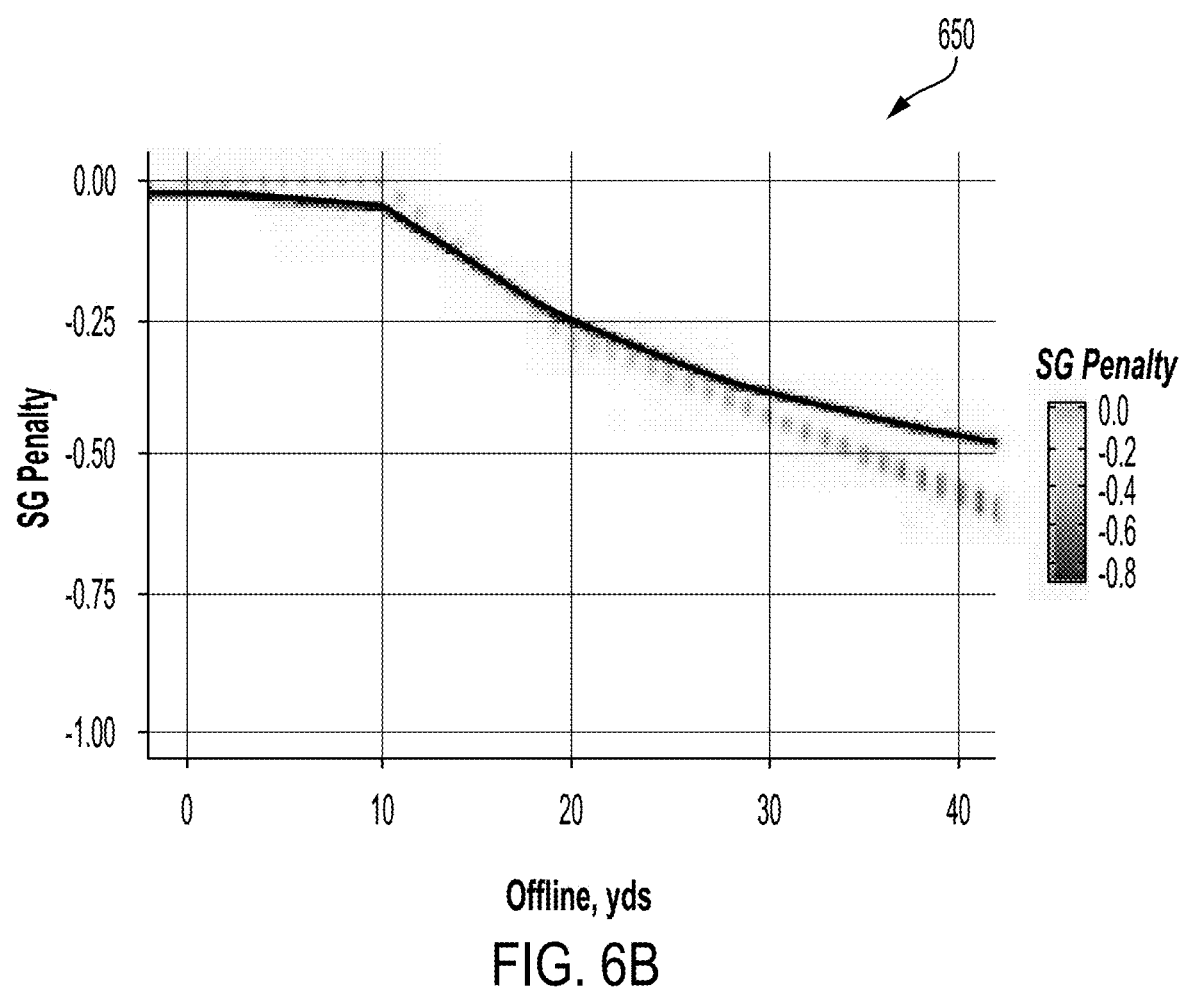
FIG. 6B is graph illustrating colored dots associated with historical shot information for proposing a variable offline penalty or function parameters of the same.

The offline penalty piece-wise function 603 considers that the further offline a shot travels the greater likelihood it has of ending up in the rough, sand, water or out of bounds. Historical ball flight data represented in FIG. 6B may be used to configure the offline penalty piece-wise function 603 to output a more accurate expected penalty for offline tee shots or other shots. In FIG. 6B, the colored dots are the proposed offline penalty and the black line is the average observed historical data. The curves suggest that drives less than 10 yards offline almost always hit the fairway, therefore they experience no strokes gained (SG) penalty relative to finding the fairway. On the other hand, drives that are 35 yards offline are penalized by roughly 0.5 strokes relative to hitting the fairway. For example, if we had a drive that traveled 305 yards downline but was 35 yards offline its strokes gained value would be the same 0.19 strokes plus the −0.5 stroke offline penalty. This yields a strokes gained value of −0.31 strokes (calculated through Equation 2). This same formulation can be applied to determine a strokes gained value for every single combination of carry and offline.

As further shown in block 606 of FIG. 6A, the computing device 108 further executes the algorithm 601 to derive an enhanced strokes gained value 605 for each shot, by leveraging logic and values from Equation 1 and Equation 2, as follows:

(Enhanced Strokes Gained Value (SG)):
SG=fairway_sg+offline_penalty     Equation 3

It should be appreciated that Equations 1-3 are merely exemplary, and that deviations from the logic described to ultimately compute the enhanced strokes gained value 605 are contemplated by the present inventive disclosure.

Referring to block 608, an enhanced strokes gained value 605 may be computed by the computing device 108 for each shot of a predetermined state area or portion of shots based on the ball flight data 104, the enhanced strokes gained value 605 considering the offline penalty (variable penalty parameter) defined by the offline penalty piece-wise function 603. Further, the total enhanced strokes gained values 605 may be averaged to define a strokes gained performance metric 607.

The strokes gained performance metric 607 may be used in a variety of different scenarios, to improve technical evaluations for club selection. For example, the strokes gained performance metric 607 can be applied to a practice session, a club fitting (wherein a certified equipment fitter provides a golfer with clubs specifically tailored to the golfer's swing), comparing an accurate club and a distance club, a specific center-of-gravity (CG) location to produce a desired shot (i.e., draw, fade, high, low), or a specific golf course (i.e., a golf course that is more penal to the right or left side of the course). Described below are a series of examples wherein the strokes gained performance metric 607 may be applied, modified for a particular application, or otherwise leveraged.

EXAMPLES

Example 1

Club A v. Club B

Figure 7A:
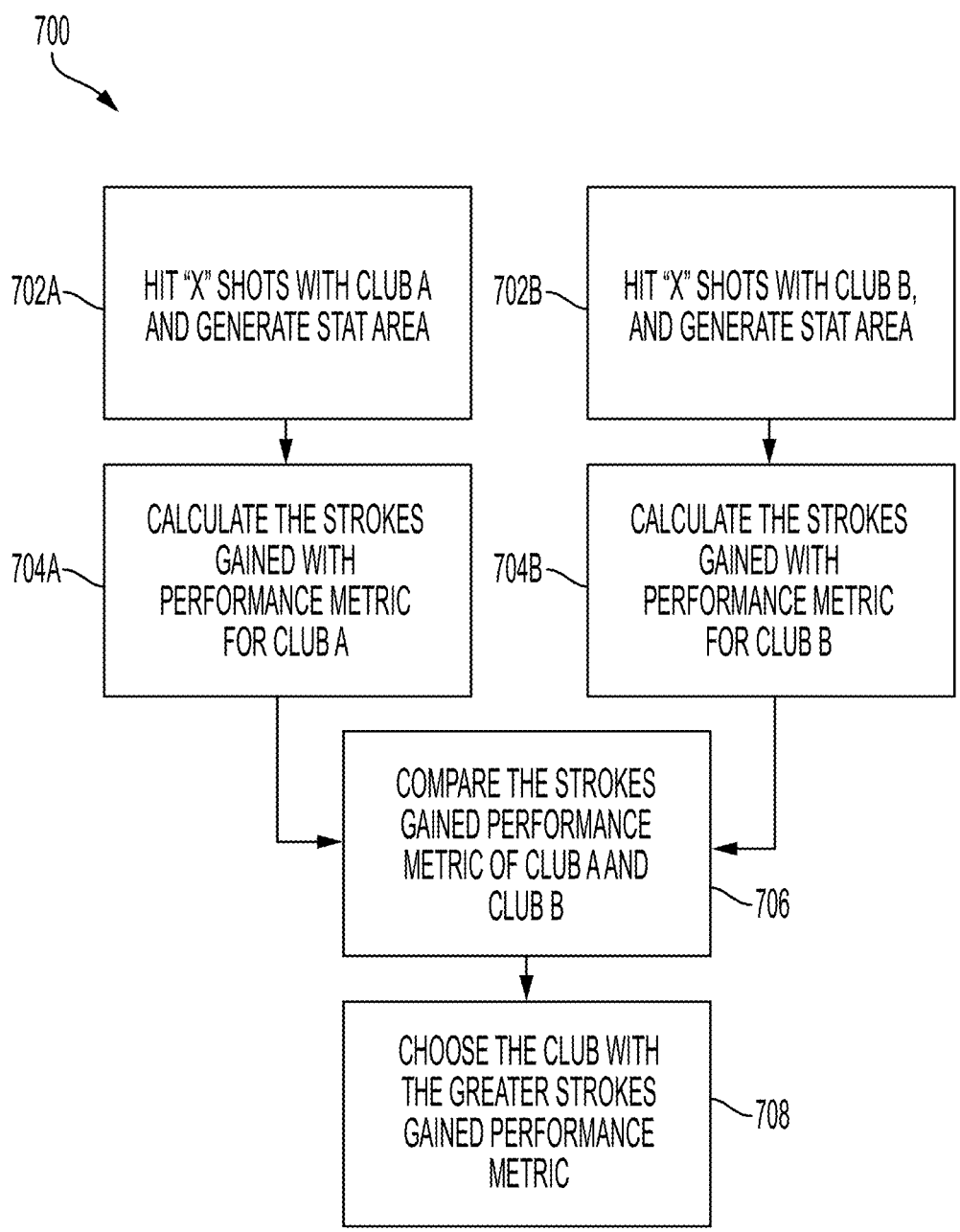
FIG. 7A is a simplified block diagram of a computer-implemented method for generating two separate strokes gained performance metrics and comparing the same to recommend one golf club versus another.
Figure 7B:
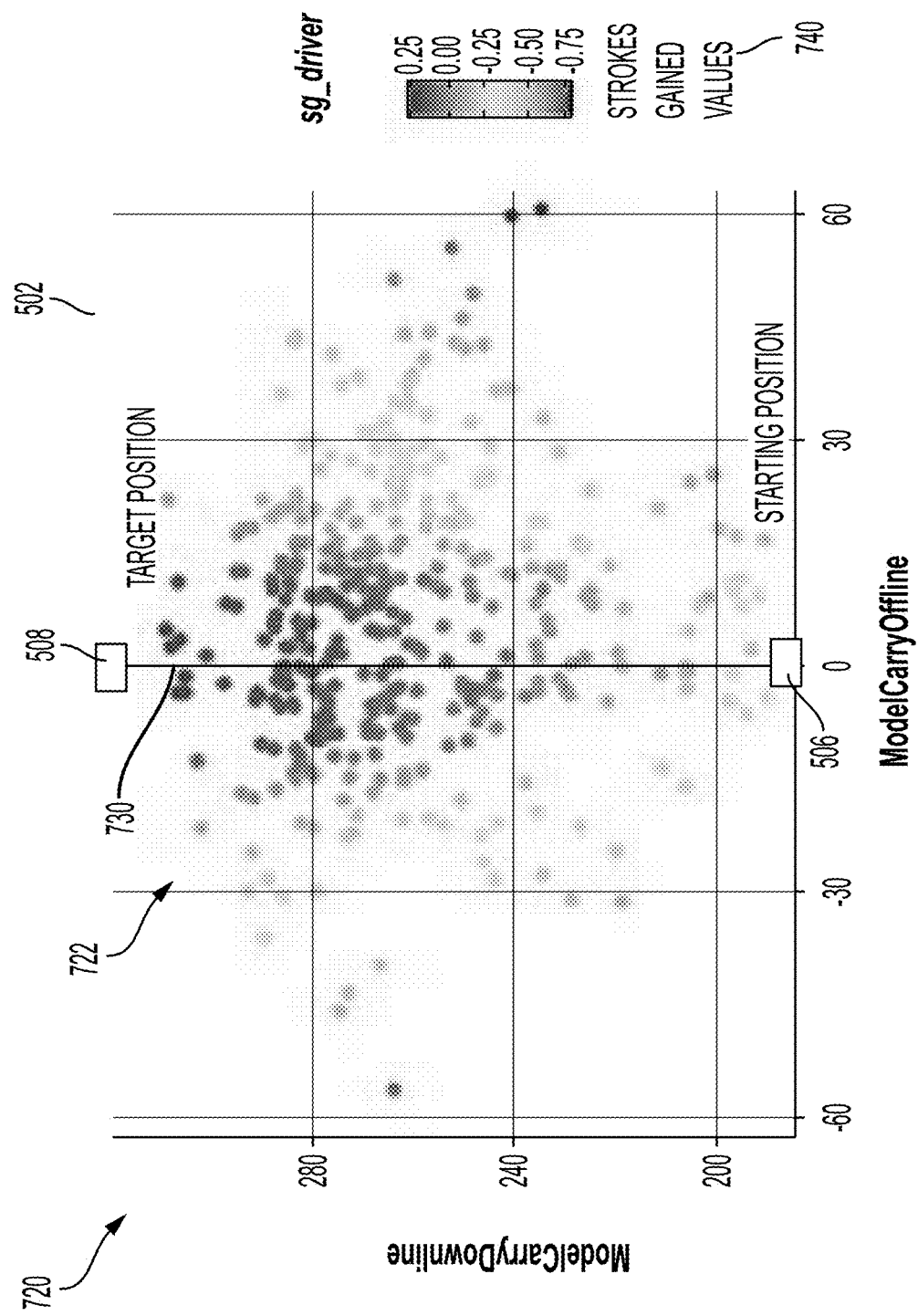
FIG. 7B is a graphical image of an enhanced shot dispersion display depicting the plurality of golf shots of FIG. 5 highlighted in various colors to illustrate the application of a gradient map and associated variable penalty parameter for each shot.

Referring to blocks 702A-702B and blocks 704A-704B of FIG. 7A, and applying the general logic described in FIG. 6A, a first instance of the strokes gained performance metric 607 can be computed for a club "A", and a second instance of the strokes gained performance metric 607 can be computed for a club "B," leveraging first and second portions, or first and second datasets of the ball flight data 104. In some embodiments, the clubs, "A" and "B", referenced may include drivers, but the present disclosure is not limited in this regard. In general, the club associated with the greater of the strokes gained performance metric 607 may be recommended as being a club that should allow the golfer to reach a target position (hole) more efficiently. This concept is further illustrated in FIG. 7B and in FIG. 7C. FIG. 7B illustrates an enhanced shot dispersion display 720 that improves upon the shot dispersion display 500 of FIG. 5 by providing (using the functionality of FIG. 6A) an enhanced strokes gained valued ("sg_driver") for each of the plurality of shots 510 and the plurality of shots 512, shown collectively in FIG. 7B as a plurality of shots 722. As in FIG. 5, the shot dispersion display 720 plots the plurality of shots 722 along the same terrain 502 relative to the starting position 506, and the target position 508. As indicated by the variety in color applied to the plurality of shots 722, the shot dispersion display 720 considers the variable penalty parameter for offline shots as described in FIG. 3 and FIG. 6A, such that shots plotted in different positions relative to a longitudinal axis 730 between the starting position 506 and the target position 508 are used to compute different (enhanced) strokes gained values 740. As shown, strokes gained values of 0.25 are computed for a portion of the plurality of shots 722 highlighted in red and plotted proximate to the longitudinal axis 730 and the target position 508. These shots are considered to be ideal, and generally not offline, such that the strokes gained values computed for the plurality of shots in this area are generally higher than those plotted farther away from the longitudinal axis 730 and the target position 508.

Figure 7C:
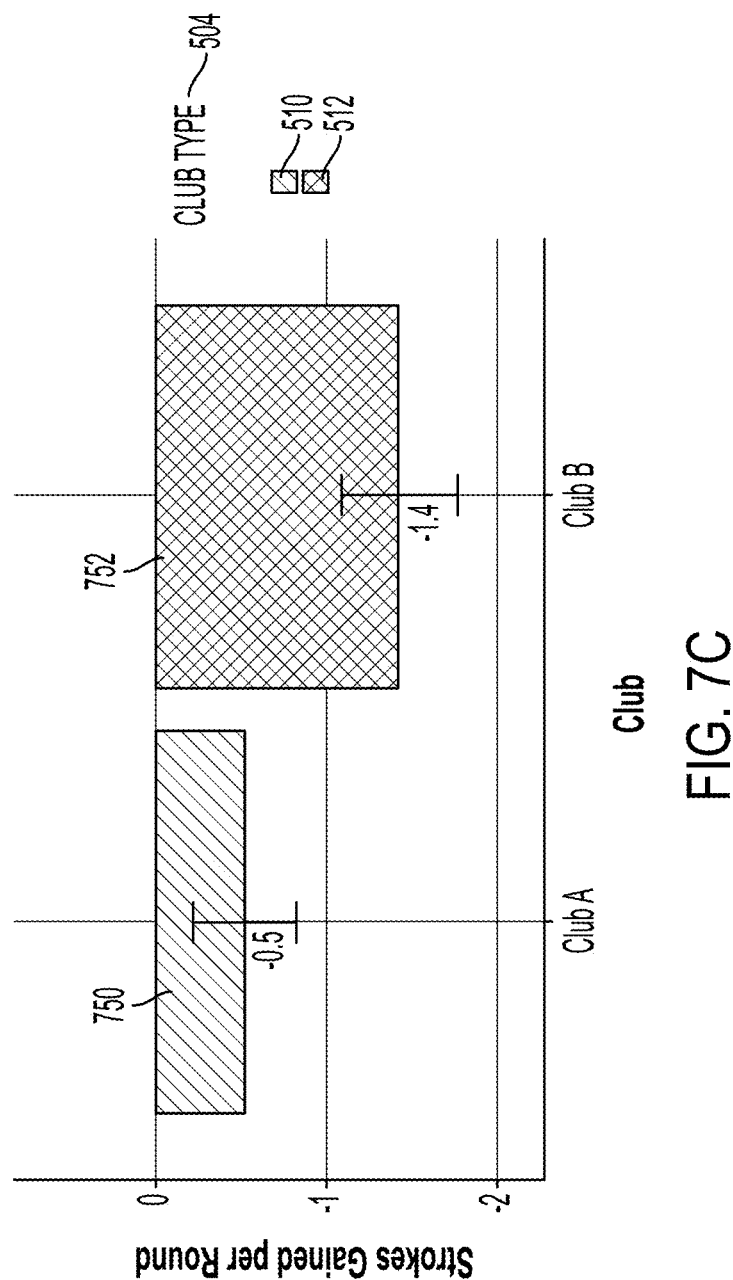
FIG. 7C illustrates two separate computed strokes gained performance metrics for two separate clubs.

FIG. 7C illustrates that the ball flight data 104 associated with the plurality of shots 510 and the plurality of shots 512 may be applied to the algorithm 601 of FIG. 6A and the functionality of FIG. 7A to derive two separate strokes gained performance metrics. Specifically, referencing FIG. 6A and FIG. 7A, a first performance metric 750 may be computed by the computing device 108 for ball flight information 104 associated with the plurality of shots 510; and a second performance metric 752 may be computed by the computing device 108 for ball flight information 104 associated with the plurality of shots 512. As described herein, because the first performance metric 750 is determined to be a greater value than the second performance metric 752, the club type 504 used to make the plurality of shots 510 may be recommended over the club type 504 used to make the plurality of shots 512.

In this specific scenario of comparing Club A v. Club B, the underlying functionality for deriving the driver strokes gained metric is designed to equally penalize shots to the right and to the left of the designated target line, or longitudinal axis 730. The first performance metric 750 and the second performance metric 752 provide a numeric value to accurately gauge the golfer's potential for success with either certain club. This provides a competitive edge for the golfer. The golfer now has a driver with the highest potential for success, while gauging his/her performance in terms of the raw data (i.e., launch, ball speed, carry, spin, etc.) as well as the potential for on course success.

Example 2

Accuracy v. Distance

Figure 8:
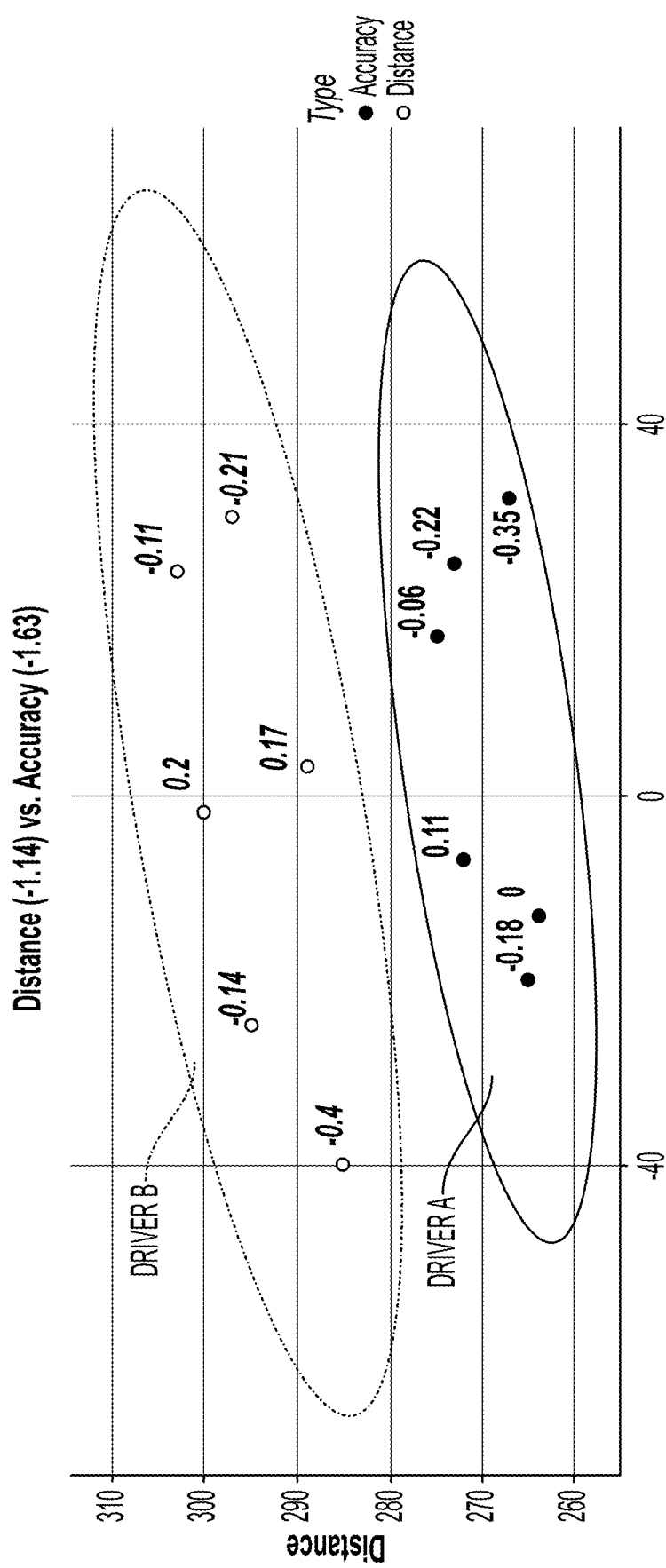
FIG. 8 is a graph plotting shot data for illustrating one scenario useful for applying the strokes gained performance metric described herein.

Referring to FIG. 8, in view of the functionality described for FIG. 6A and FIG. 7A, the strokes gained performance metric 607 can be used during a club fitting to compare the performance of an accurate golf club (i.e., a 44 inch driver that travels an average of 275 yards downline and 5 yards offline) versus the performance of a distance golf club (i.e., a 46 inch driver that travels an average of 300 yards and 12 yards offline). The strokes gained performance metric 607 balances the potential for success as a golfer hits a golfer hits a golf shot offline and downline. At least in some embodiments, the farther a golf shot is hit downline the greater potential for success. Further, the more accurate a golf shot is hit online, the greater potential for success. However, it may be difficult to evaluate whether it is better to be shorter downline, but more online, or father downline, but more offline.

Some golfers will often time play longer shafted drivers (i.e., a 46 inch driver) to gain distance, while some golfers will often time play shorter shafted driver (i.e., a 44 inch driver) to gain accuracy (the average driver shaft length is approximately 45 inches). The strokes gained performance metric 607 can be used to accurately evaluate whether a golfer will benefit more for an accurate driver (Driver A) or a distance driver (Driver B). For example, the golfer can hit "X" shots with Driver A to calculate the strokes gained performance metric. The golfer can then hit "X" shots with Driver B to calculate the strokes gained performance metric. Following the test, the strokes gained performance metric for both golf clubs can be compared and the club can be chosen that relates to the highest metric. In this specific scenario the driver strokes gained metric (gradient) is designed to equally penalize shots to the right and to the left of the designated target line. The golfer can then have a numeric value to accurately gauge the golfer's potential for success, whether it is the accurate driver or the distance driver. This provides a competitive edge for the golfer. The golfer now has a driver with the highest potential for success, while gauging his/her performance in terms of the raw data (i.e., launch, ball speed, carry, spin, etc.) as well as the potential for on course success.

Example 3

Specific CG Position

Figure 9:
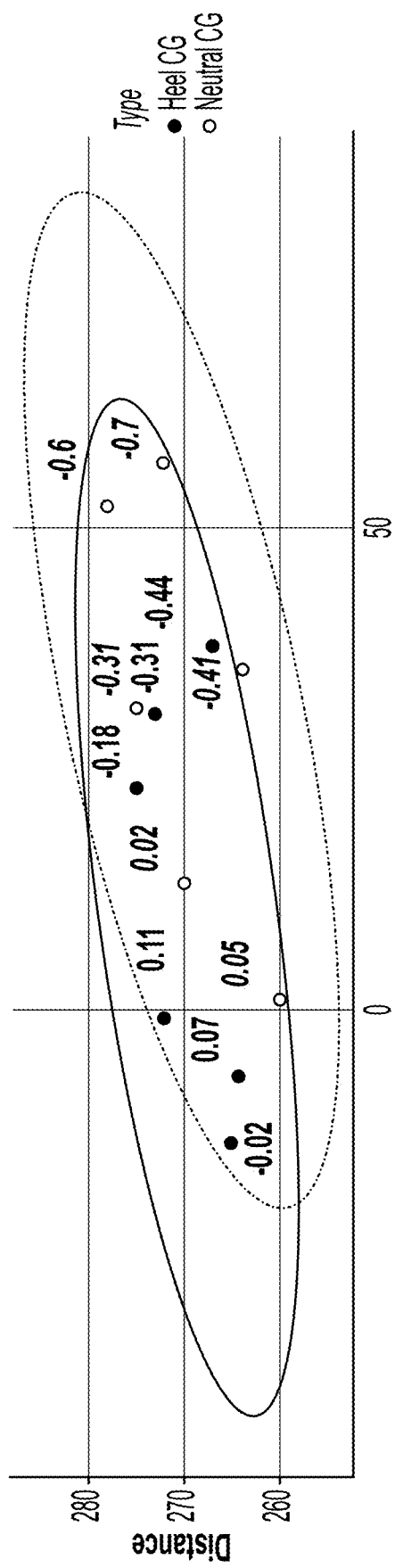
FIG. 9 is a graph plotting shot data for illustrating one scenario useful for applying the strokes gained performance metric described herein.

Referring to FIG. 9, in view of the functionality described for FIG. 6A and FIG. 7A, the strokes gained performance metric 607 can be used during a club fitting to compare the performance of a golf club with a specific CG location (i.e., a driver with a heel side CG placement that draws) versus the performance of a second golf club with a second CG location (i.e., a driver with a toe side CG placement that fades). The strokes gained performance metric 607 balances the potential for success as a golfer hits a golfer hits a golf shot offline and downline. In some embodiments, a golf shot hit further downline corresponds to a greater potential for success. Further, the more accurate a golf shot is hit, online, the greater potential for success. However, in most cases, a draw shot goes farther, but is more difficult to keep online, while a fade shot is easier to control online, but difficult to hit far. Often times, golfers do not play a golf club with the proper CG location for their swing (i.e., a golfer who hits a bad slice playing a neutral CG, a golfer who hits a bad hook playing a neutral CG, etc.). If the golfer who plays a bad slice (i.e., 25 yards offline), plays a driver with a heel side CG position, the golf club weighting will counteract the slice and promote a draw, thereby increasing the accuracy of the driver (i.e., bringing the original 25 yards offline to 12 yards offline).

Some golfers employ a club head that has a CG located near the heel side (i.e., to hit a top-spinning draw shot) to negate the effects of a golfer's slice swing (and produce a straight, online shot), while some golfers employ a club head that has a CG located near the toe side (i.e., to hit a under-spinning fade shot) to negate the effects of a golfer's hook swing (and produce a straight, online shot). The strokes gained performance metric 607 can be used to accurately evaluate whether a golfer will benefit more from a central CG driver (Driver A) or a heel-side CG driver (Driver B). For example, the golfer can hit "X" shots with Driver A, and the strokes gained performance metric 607 can be calculated. The golfer can then hit "X" shots with Driver B, and the strokes gained performance metric 607 can be calculated. Following the test, the driver strokes gained performance metrics can be compared for both golf clubs to choose the club with the highest metric. In this specific scenario the driver strokes gained metric (gradient) is designed to equally penalize shots to the right and to the left of the designated target line. The golfer, with a slice swing tendency, will likely see an increase in his/her driver strokes gained metric when using the driver head with a heel-side CG that negates the slice swing tendencies, and produces straighter shots. The golfer can then have a numeric value to accurately gauge the golfer's potential for success, whether it is the central CG driver or the heel-side driver. This provides a competitive edge for the golfer. The golfer now has a driver with the highest potential for success, while gauging his/her performance in terms of the raw data (i.e., launch, ball speed, carry, spin, etc.) as well as the potential for on course success.

Further, the strokes gained performance metric 607 can be used to accurately evaluate whether a golfer will benefit more from a central CG driver (Driver A) or a toe-side CG driver (Driver B). For example, the golfer can hit "X" shots with Driver A, to calculate the strokes gained performance metric 607. The golfer can then hit "X" shots with Driver B, to calculate the strokes gained performance metric 607. Following the test, the strokes gained performance metrics can be compared for both golf clubs to choose the club with the highest metric. In this specific scenario the driver strokes gained metric (gradient) is designed to equally penalize shots to the right and to the left of the designated target line. The golfer, with a hook swing tendency, will likely see an increase in his/her driver strokes gained metric when using the driver head with a toe-side CG that negates the hook swing tendencies, and produces straighter shots. The golfer can then have a numeric value to accurately gauge the golfer's potential for success, whether it is the central CG driver or the toe-side driver. This provides a competitive edge for the golfer. The golfer now has a driver with the highest potential for success, while gauging his/her performance in terms of the raw data (i.e., launch, ball speed, carry, spin, etc.) as well as the potential for on course success.

Furthermore, the strokes gained performance metric 607 can be used during a club fitting to compare the performance of a golf club with a specific launch (i.e., a driver with a forward CG placement that launches low) versus the performance of a second golf club with a specific launch (i.e., a driver with a deep CG placement that launches high). The strokes gained performance metric 607 balances the potential for success as a golfer hits a golfer hits a golf shot offline and downline. At least in some embodiments, the farther a golf shot is hit downline the greater potential for success. Further, the more accurate a golf shot is hit, online, the greater potential for success. However, in some cases, a high shot that carries farther in wet conditions is preferable, whereas in dry windy conditions a low shot that rolls farther is preferable.

Some golfers will often times play a club head that has a CG located near the strike face (i.e., to hit a low launching and low spinning shot) to gain distance off of roll (often times in dry or windy conditions), while some golfers will often time play a club head that has a CG near the rear of the club (i.e., to hit high launching shot) to gain distance off of roll (often times in wet conditions, where the ball barely rolls). The strokes gained performance metric 607 can be used to accurately evaluate whether a golfer will benefit more from a low launching shot (Driver A) or a high launching shot (Driver B). For example, the golfer can hit "X" shots with Driver A to calculate a strokes gained performance metric for Driver A, and then the golfer can then hit "X" shots with Driver B, to calculate the strokes gained performance metric for Driver B. Following the test, the driver strokes gained performance metrics for both golf clubs can be compared to choose the club with the highest metric. In this specific scenario the driver strokes gained metric (gradient) is designed to equally penalize shots to the right and to the left of the designated target line. The golfer can then have a numeric value to accurately gauge the golfer's potential for success, whether it is the low launching driver or the high launching driver. This provides a competitive edge for the golfer. The golfer now has a driver with the highest potential for success, while gauging his/her performance in terms of the raw data (i.e., launch, ball speed, carry, spin, etc.) as well as the potential for on course success.

Example 4

Course-Specific Gradient

Figure 10:
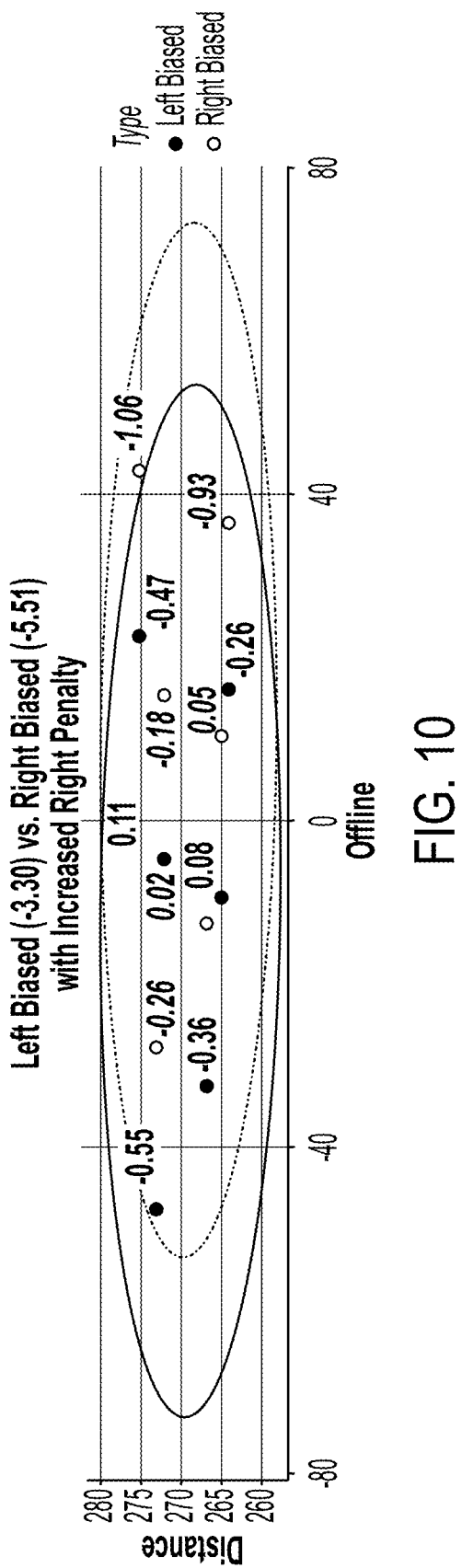
FIG. 10 is a graph plotting shot data for illustrating one scenario useful for applying the strokes gained performance metric described herein.

Referring to FIG. 10, in view of the functionality described for FIG. 6A and FIG. 7A, in some embodiments, the strokes gained performance metric 607 can be adjusted (and used) or otherwise reconfigured during a practice session or fitting session to compare the performance of two golf clubs on a specific golf course, to, e.g., accurately display the average offline penalty of the 18 holes of the specified course. For example, in an exemplary reference golf course, the course is positioned such that the ocean is along the entire right side of 8 of the 18 holes. This drastically affects the penalty of going offline to the right. The other 10 of the 18 holes have a variety of fairway widths, and penalties when going offline right and left; however, when averaged with the strong penalty of going offline right on 8 of the holes, the strokes gained performance metric 607 may be configured such that the penalty of going right offline is more penal than the standard strokes gained performance metric. In other words, the offline penalty piece-wise function 603 of the algorithm 601 may be configured to apply a variable penalty parameter that provides a stronger penalty (loss to strokes gained) for shots going offline to the right. This configuration may affect a corresponding gradient map such as the gradient map 300, to illustrate the stronger penalty applied by the offline penalty piece-wise function 603 as specially configured in this scenario. In addition, where the offline penalty piece-wise function 603 of the algorithm 601 is configured as described, this configuration naturally adjusts the computation of the strokes gained performance metric 607 ultimately calculated in this scenario.

This adjusted performance metric 607 can then be used during a practice session or fitting session to compare the performance of two golf clubs for this exemplary reference golf course, prior to playing the course. As previously described, some golfers prefer a club head that has a CG located near the heel side (i.e., to hit a top-spinning draw shot) to gain distance off of roll, while other golfers prefer a club head that has a CG located near the toe side (i.e., to hit an under-spinning fade shot) to gain accuracy, since the ball will hit and stop. However, if the golfer who plays the club head with a CG near the toe (to hit a fade) tends to miss drastically to the right, the strokes gained performance metric can be used to accurately evaluate whether a golfer will benefit at the course more from a fade-bias (Driver A) or a draw-bias (Driver B). For example, the golfer can hit "X" shots with Driver A to calculate the strokes gained performance metric, for Driver A, and the golfer can then hit "X" shots with Driver B to calculate the strokes gained performance metric for Driver B. Following the test, the driver strokes gained performance metrics for both golf clubs can be compared to choose the club with the highest metric, at the subject exemplary golf course. In this specific scenario the driver strokes gained metric (gradient) is designed to penalize shots to the right greater than shots to the left. The golfer can then have a numeric value to accurately gauge the golfer's potential for success at the course, whether it is with the fade-bias driver or the draw-bias driver. This provides a competitive edge for the golfer, prior to playing a specific golf course. The golfer now has a driver with the highest potential for success at a specific course, while gauging his/her performance in terms of the raw data (i.e., launch, ball speed, carry, spin, etc.) as well as the potential for on course success.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

The above examples may be described or utilized in connection with any type of golf club. Alternatively, the apparatus, methods, and articles of manufacture described herein may be applicable to other type of sports equipment such as a hockey stick, a tennis racket, a fishing pole, a baseball bat, etc., where it is desired to analyze shot distances using these alternate forms of sports equipment. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of computing a strokes gained performance metric from ball flight data that considers predetermined offline information, comprising:
   accessing, by a processor, a first dataset associated with a first plurality of shots from a first golf club;
   generating, by the processor, a first performance metric from the first dataset, by, steps of:
   (i) computing a set of strokes gained values by considering at least a difference between a predefined expected hole out value corresponding to a target distance and a predefined expected hole out value corresponding to an actual carry distance for each of the first plurality of shots from the first golf club,
   (ii) executing a predefined offline penalty function for each of the set of strokes gained values to derive a respective penalty parameter for each of the first plurality of shots from the first golf club, the respective penalty parameter determined by offline information including a landing position of each of the first plurality of shots relative to a target position,
   (iii) applying the respective penalty parameter to each of the corresponding set of strokes gained values, and
   (iii) averaging the set of strokes gained values as modified by the respective penalty parameter;
   generating, by the processor, a second performance metric derived by applying steps (i) to (iv) to a second dataset associated with a second plurality of shots from a second golf club; and
   recommending a selection between the first golf club and the second golf club by identifying the greater of the first performance metric and the second performance metric.

2. The method of claim 1, wherein the predefined offline penalty function defines a plurality of predefined geographical regions comprised of physical coordinates between the target position and the starting shot position, each of the plurality of predefined geographical regions defining a predetermined input value for the respective penalty parameter.

3. The method of claim 2, wherein the plurality of predefined geographical regions includes a first region extending along a linear path between the target position and the starting shot position, and at least a second region extending along a first lateral side of the first region such that the second region is at least partially offset from the target position and outside the first region, the second region defining a predetermined input value for the respective penalty parameter for given ones of the first plurality of shots from the first golf club that fall within the second region and are offline relative to the target position.

4. A computing system configured for computing a strokes gained performance metric from ball flight data that considers predetermined offline information, comprising:
a tracking device that provides flight data for each of a plurality of golf shots struck by a golf club from a starting position, the flight data including a post-shot distance between a landing position and a target position; and
a processor in operable communication with the tracking device, configured to:
compute, for each of the plurality of golf shots, a respective strokes gained value that defines a predefined expected hole out value from the landing position to the target position that considers the post-shot distance and a total distance between the target position and the starting position, and
transform, for each of the plurality of golf shots, the respective strokes gained value to an enhanced strokes gained value that considers offline information by applying a variable penalty parameter based on the landing position relative to a predefined gradient map between the starting position and the target position,
wherein the enhanced strokes gained value defines a unique expected hole out value based on the landing position relative to the predefined gradient map that considers offline information.

5. The computing system of claim 4, wherein the processor is further configured to:
recommend a selection of the golf club used to strike the plurality of golf shots by identifying that the enhanced strokes gained value is greater than an alternative enhanced strokes gained value associated with an alternative golf club and another plurality of golf shots struck by the alternative club.

6. The computing system of claim 4, further comprising:
a display in operable communication with the processor for displaying, upon instructions by the processor, the target position, the predefined gradient map, and the landing position of each of the plurality of golf shots to visually depict offline characteristics utilized to transform the respective strokes gained value using the variable penalty.

7. The computing system of claim 4, wherein the processor is further configured to:
compute the variable penalty parameter for a given landing position associated with a given one of the plurality of golf shots by applying information associated with the given landing position to a piece-wised function associated with the predefined gradient mapping, the piece-wise function configured to output a value for the variable penalty parameter based on where the landing position is located relative to the predefined gradient mapping.

8. The computing system of claim 7, wherein the processor is further configured to:
modify the variable gradient map and the piece-wise function to accommodate unique characteristics of a particular course or practice range.

9. The computing system of claim 4, wherein a first portion of the variable gradient mapping is considered to be offline and corresponds to a positive value for the variable penalty parameter, and a second portion of the variable gradient mapping is considered to be online relative to the target position and corresponds to a null value for the variable penalty parameter.

10. A tangible, non-transitory, computer-readable media having instructions encoded thereon, the instructions, when executed by a processor, are operable to:
access flight data associated with a plurality of golf shots from a first golf club, the flight data including, for each of the plurality of golf shots, a post-shot distance between a landing position and a target position;
compute, for each of the plurality of golf shots, a respective strokes gained value; and
compute a performance metric for the first golf club, by performing operations including:
generating a respective variable penalty parameter for each of the plurality of golf shots based on the landing position relative to a predefined gradient mapping between the starting position and the target position, and
applying, for each of the plurality of golf shots, the variable penalty parameter to the respective strokes gained value.

* * * * *